May 21, 1963 L. E. BERGGREN 3,090,328
TRANSPORTATION SYSTEMS
Filed Sept. 15, 1961 2 Sheets-Sheet 1
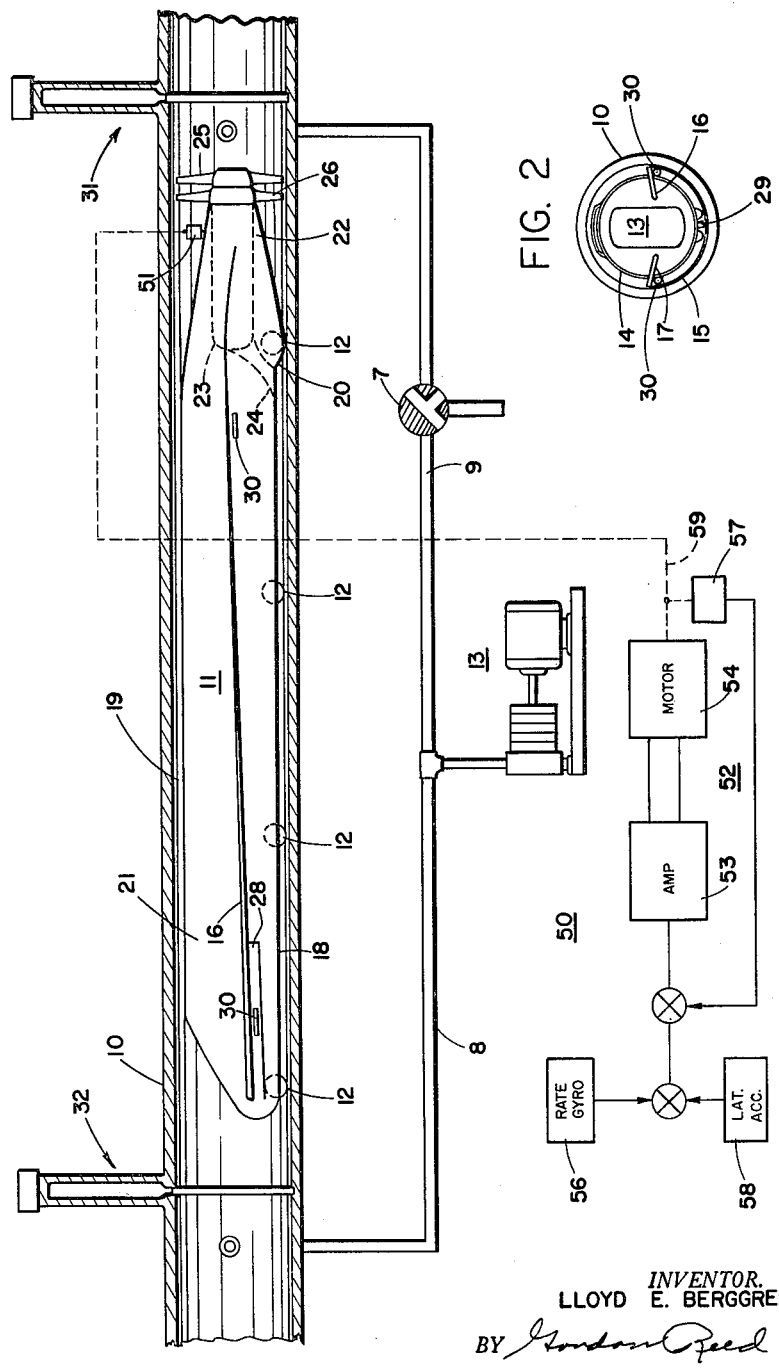
*INVENTOR.*
LLOYD E. BERGGREN
BY
ATTORNEY.

INVENTOR.
LLOYD E. BERGGREN
BY Gordon Reed
ATTORNEY

United States Patent Office 3,090,328
Patented May 21, 1963

3,090,328
TRANSPORTATION SYSTEMS
Lloyd E. Berggren, Minneapolis, Minn., assignor to Minneapolis-Honeywell Regulator Company, Minneapolis, Minn., a corporation of Delaware
Filed Sept. 15, 1961, Ser. No. 138,402
12 Claims. (Cl. 104—138)

This invention relates to the transportation of people, baggage and other freight and more particularly relates to a pneumatic tube type of transportation system generally similar to that disclosed in Patent 1,813,625 to Knox dated July 7, 1931.

One object of the invention is to improve the general construction of such system.

A further object of the invention is to provide an improved transportation system involving supporting a vehicle or car within the surrounding tube by interaction of the air and vehicle exterior while the car traverses the length of the tube.

A further object of the invention is to provide an improved arrangement of the car and tube to facilitate discharge of passengers.

A further object is to stabilize the craft within the tube while in motion.

A further object of the invention is to facilitate the automatic control of the operation of the vehicle and the associated systems by a central computer.

The above and other objects of the invention will be more apparent upon consideration of the following description, taken in conjunction with the subjoined drawings.

In the accompanying drawings showing one embodiment of the invention and wherein like reference characters indicate like parts of the several views:

FIGURE 1 is a side elevation partly in section showing the car within the surrounding tube and means on the car for stabilizing the car while in motion;

FIGURE 2 is a frontal view of the car while in the tube;

Figure 3:
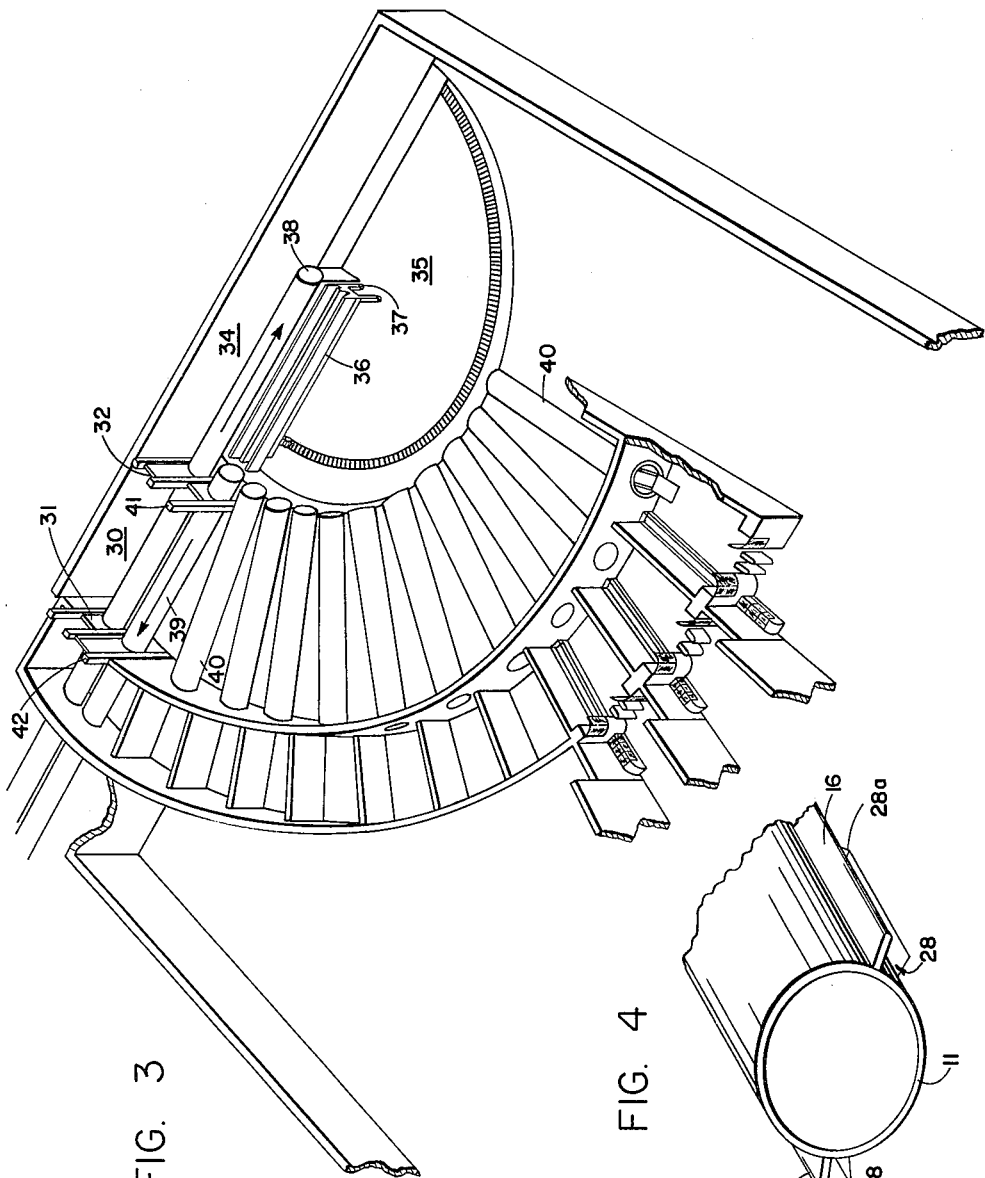
FIGURE 3 shows an end of the line arrangement for rerouting the car to a different tube following completion of a run.

This improvement in ground transportation systems, while not restricted thereto but for the purpose of disclosing one embodiment thereof, is based upon a partially evacuated, dual-tube system. Each tube is approximately ten feet in diameter but this dimension is not absolute and is related to the maximum vehicle speed. The tubes connect the terminals of cities to be serviced. Each tube guides a self-propelled, airborne vehicle carrying approximately fifty people and their accompanying baggage at a speed in the neighborhood of 300 miles per hour from terminal to terminal. The concept of operation in an evacuated tube rather than one at atmospheric pressure is an economic choice and permits the achievement of high speed with moderate power by providing a pressure altitude similar to that existing at 30,000 to 40,000 feet.

Operation of the car within the tube at 300 miles per hour requires a tube system with gentle or gradual turns to prevent generation of prohibitively high "g" forces. Thus the turn radius for such a vehicle in the horizontal plane is in the neighborhood of 10,000 feet and in the vertical plane is greater, being approximately 30,000 feet. These estimates are not absolute and are based primarily on human factors such as "g" tolerance.

As stated the tube is partially evacuated and is constructed to withstand the resulting differential pressure between the atmospheric pressure on the outside and the internal pressure. The tube is basically circular in cross section. The vehicle is designed to "fly" in the tube in the sense that it is supported by air. The vehicle is supported in flight by a combination of aerodynamic, Bernoulli, and ground effect forces. In flight, the vehicle load is distributed essentially over an area equal to the projected horizontal cross-section of the vehicle resulting in a unit loading of approximately 0.5 pound per square inch.

The tube may be elevated to pass over man-made obstructions, rivers and gullies, and in some areas may be arranged beneath the terrain surfaces so as to pass under high value property, through mountains, or under rivers; under most circumstances however the tube may be located at ground level with supports at appropriate intervals to maintain tube alignment.

All of these variations in tube construction types may be employed in any given system; the choice of a specific type of construction at a given location will depend upon both technical and economic factors.

Referring now in detail to the drawings, I have shown in FIGURE 1 a tube 10, which is in the form of an elongated tubular duct or tunnel. It is of sturdy construction and preferably fabricated of steel or similar metal.

The application of a pumping arrangement to an elongated tube has been disclosed in the prior patent to Knox 1,813,625 so that the application of the pumps to the elongated tube 10 to reduce the air pressure therein from three to four pounds per square inch may be considered conventional. It has been shown herein as a pump and motor unit 13, FIGURE 1, with pipe 8 the continuous exhaust line and 9 the alternative intermittently effective pressure line during isolation of a vehicle 11. The tube is maintained at the operating pressure by such pumping stations distributed along the length of the tubes.

Traversing the tube 10 is a passenger car or vehicle 11 approximately in length nine times as great as the tube diameter. Structurally, the car or vehicle 11 is essentially the equivalent of an aircraft fuselage. The entire length is basically cylindrical in cross section and is a simple structure. An access door 13 as shown in FIGURE 2 is located at the front of the car. At rest, the vehicle 11 is supported on faired wheels or trucks 12 located at the bottom of the vehicle that roll on the inner bottom of the tube.

Nonload carrying bumper wheels 30 are provided on each side of the vehicle near the plane of the horizontal centerline to prevent the vehicle from scraping or rubbing against the tube wall while rolling on the main load carrying wheels 12.

The power plant 22 is located at the rear or aft end of the vehicle. In this configuration the power plant is shown to be a gas turbine 23 having an air inlet 24 and driving contra or oppositely-rotating propellers 25, 26. The contra-rotating propellers 25, 26 prevent transmittal of a net torque to the vehicle which would cause it to tend to rotate about its longitudinal axis. Since the type of propulsion system employed to propel the vehicle through the tube is not particularly pertinent to this invention it is clear that the propulsion system could be comprised of any type of prime mover powering the propellers, or even a pure jet engine.

The vehicle 11 as stated is basically cylindrical in cross section, resulting in a simple structure not unlike an aircraft fuselage. At rest and at low speeds the vehicle is supported on several sets of wheels or trucks 12 located at the bottom of the vehicle. These wheels roll on the inner bottom surface of the tube. The vehicle is propelled through the tube by the thrust generated by the power plant. This thrust induces the air to flow from the front of the vehicle around the vehicle to the space behind the vehicle. The vehicle has a basic diameter sufficiently smaller than that of the tube so that an annular space is formed between the vehicle and the tube wall through which the gas or air in the tube can pass around the vehicle. The upper one-half of this annulus is the main flow area through which the air passing around the vehicle flows. The lower half of the annulus is separated from the upper half of the annulus by longitudinal fins 16, 17 which extend or slant upwardly from front to rear the length of the vehicle. The fins are slightly below the longitudinal centerline of the vehicle at the front end but are at the same height therewith at the rear end. The vehicle cross section is increased locally near the rear end (at rear truck 12) and at this section over the lower half of the vehicle only (between the fins 16 and 17). The cross-sectional enlargement or flange 20 provided for the lower half of the vehicle 11 near the rear end serves to restrict the relative air flow area. Thus the relatively moving air entering the lower portion 18 of the annulus between tube 10 and vehicle 11 under way is slowed with respect to the vehicle 11 which is the same as to say accelerated with respect to the tube 10. The net result of this treatment of the air under the vehicle at 18 is to raise its static pressure, this coming about by the conversion of velocity pressure to static pressure. Consider now the air which is relatively passing over the top of the vehicle through the upper portion 19 of the annulus. This air is being accelerated by the propulsion system, increasing the velocity pressure at the expense of the static pressure of the air stream. The net result is a lowering of the static pressure above the vehicle. It is apparent from the foregoing that a pressure differential is thus generated which is equal to the difference between the static pressure under the vehicle and the static pressure over the vehicle, and that this pressure differential acting over the projected area of the vehicle from the front end to a point adjacent rear truck 12 develops a lifting force to support the vehicle in motion.

The actual lifting force will be affected by the medium within the tube or tube air density, the vehicle velocity, and by the position of the vehicle with respect to the tube walls. The lifting force just described is generated by a combination of aerodynamic forces, Bernoulli forces, and ground effect forces.

While the preceding paragraph describes how the basic lifting force is generated so that the vehicle is airborne, the vehicle is also designed to operate stably in flight so that it automatically positions and aligns itself with respect to the tube. Vertical height control is achieved automatically in that if the vehicle rises, the portion of the annulus formed at rear truck 12 about the vehicle lower portion of the increased cross section increases, increasing the through flow air velocity under the vehicle thereby reducing the static pressure (and the lifting force) under the vehicle.

Figure 4:
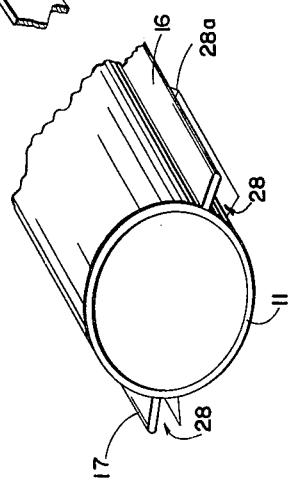
FIGURE 4 is a perspective view of a section of FIGURE 1 showing details of the short side channels that are involved in providing pitch and yaw aerodynamic system stability.

Horizontal and vertical alignment of the longitudinal axis of the vehicle or pitch and yaw of the vehicle are automatically achieved by proper fin location, these functions being effected by the provision of short, somewhat horizontally mounted channels 28, 28a, FIGURE 4 having the rear end closed, just under the fins 16, 17 near the front of the vehicle and a short, vertical centerline fixed fin, divider 29, FIGURE 2 (omitted from FIGURE 1 for simplification thereof) which separates the lower annulus portion about the lower portion of the vehicle at rear truck 12, into two approximately 90° quadrants. Fin 29 extends forwardly a short distance beyond rear truck 12 to the cross section adjacent next truck 12. Now, if the front of the moving vehicle 11 rises changing pitch attitude upward, the static pressure in the forward channels 28, 28a, which are below the center, will fall since the discharge area controlling the channel flow is increased thus reducing the total lift at the front end of the vehicle causing the front end to come down. This will be readily appreciated by visualizing such channel as being shifted from its present position until it is on the bottom of the longitudinal centerline. If the channel 28 with its closed end be near the surface of tube 11 little air passes out the closed end of the channel. However, if the front end of the vehicle rises the channel closed end now permits air to spill over the closed end and in effect increases the discharge area of the channel. A similar effect is desired from the two channels circumferentially spaced from the bottom but below the horizontal centerline of the vehicle. If the front end drops, the static pressure in these channels rises since the discharge area controlling the channel flow is decreased thus increasing the total lift at the front end of the vehicle causing the front of the vehicle to rise. The rise and fall of the rear end of the vehicle will in a similar manner cause a corrective change in the lifting force near the rear of the vehicle. If need be, local channeling may be employed to produce a greater rate of change of lift with vertical displacement. Thus the vehicle seeks an equilibrium position in pitch to avoid subsequent upward or downward tilting motion of its longitudinal axis. If the front end of the vehicle 11 shifts or yaws in the horizontal plane toward one side or the other thus changing the position of the vertical plane through the longitudinal axis, the channel 28 near the close wall will experience a rise in static pressure and the other opposite channel 28a a reduction in static pressure, thus generating difference in static forces tending to return the vehicle 11 to the center of the tube. It should be apparent that the rate of change of static pressure in these channels with respect to their proximity to the tube wall can be increased if the channels are designed to discharge into the low pressure stream passing over the upper portion of the vehicle.

Similar centering action to correct for yaw or angular shift of the vehicle along the centerline is produced by the two 90° annular quadrants formed by the fins 16, 17 and vertical fin 29 in the lower annulus at the rear of the vehicle and forward of the local enlargement.

The fins 16 and 17 as stated are pictured purposefully as originating below the vehicle horizontal centerline at the front end of the vehicle and spiralling gently from this point to the horizontal centerline near the rear of the vehicle. The intent here is that this fin orientation may aid in stabilizing the vehicle in the pitch axis. If the previously described channels 28 are in themselves sufficient to produce vehicle pitch stability, the fins 16, 17 may be located on the horizontal centerline for the length of the vehicle.

It should be obvious that a fin and channel configuration that will render the vehicle stable at all speeds may vary with the vehicle weights, and vehicle center of gravity locations.

To achieve static stability in the roll axis the center of gravity of the vehicle 11 must be kept below a point which in marine engineering is called the metacenter. With the center of gravity so located the vehicle will tend to maintain a desired roll orientation (an upright position) in the roll axis with respect to the apparent gravity field which with the moving vehicle in a turn has horizontal as well as vertical components. When the vehicle is aerodynamically supported there will be partial damping in the roll axis by the centerline vertical fin 29 (FIGURE 2) on the lower part of the car from rear truck 12 to the adjacent truck 12 and by fins 16, 17 and channels 28, 28. Lateral shifting of the center of gravity and forward movement of the vehicle through turns will introduce roll torques which will cause the vehicle to rotate about the roll axis.

To additionally meet the roll axis stability requirements, a roll axis control loop or servo-mechanism 50 on the car which provides damping, turn coordination, and static trim (to compensate for lateral movement of the center of gravity) is provided. The control means of loop 50 for purpose of clarity is shown in FIGURE 1 separated from the car 11. A feasible means of meeting the previously stated control requirements utilizes an aerodynamic control surface 51 rotatable about an axis normal to the vehicle longitudinal axis and herein mounted on top and toward the rear of vehicle 11 to produce torque about the vehicle roll axis. This surface would be positioned or operated by a conventional phase sensitive motor means 52 comprising amplifier 53 and motor 54 controlled by a reversible-phase variable-magnitude voltage signal from a roll-rate gyro 56 sensing vehicle roll rate to provide damping and a reversible-phase variable-magnitude voltage signal from a lateral accelerometer 58 which provides a signal tending to align the vehicle normally vertical axis with the direction of the apparent vertical to provide the vehicle turn coordination and trim functions. The output shaft 59 of follow-up motor 54 positions surface 51 and as conventional in follow-up systems drives motor displacement signal generator 57 to balance the input signals to amplifier 53.

The power plant 22 operates at essentially constant power setting and a turbojet or turboprop power plant may be used to propel the vehicle. Other means such as electric motor means, as stated, may alternatively be used to displace the car along the tube.

For stopping the vehicle, aerodynamic braking may be used to decelerate the vehicle until sufficient lift force is lost to bring the vehicle down on wheels 12 and thereafter wheel brakes (not shown) are used for low-speed braking.

With the car at rest, air locks 31, 32 may be used in one manner as shown in FIGURE 1 to isolate car 11 and the portion of tube 10 occupied thereby from the remainder of tube 10.

The air pressure in the isolated portion may be built up by suitable means, such as by exhaust line 9, vented alternatively to the outside air by a three-way valve 7.

In FIGURE 3 which shows an end-of-line type terminal, the air locks 31, 32 may be used in a different manner. When an arriving vehicle 11 has reached station 30, an air lock 31 adjacent the rear of the arriving vehicle is initially closed after which a second air lock 32 near the front of the arriving vehicle 11 is opened thus exposing the portion of the tube surrounding the car 11 at rest to atmospheric air. The car 11 may then be rolled, by suitable means (not shown), into a tube portion 38 to the right of the opened air lock 32 which tube portion comprises part of a rerouting station 34. The arrangement 34 includes a turntable 35 which includes a cradle 36 adjacent to tube portion 38. The cradle 36 may be provided with a vertical pivot 37. The cradle 36 may be rotated counter-clockwise from its position in FIGURE 3 about pivot 37 until it is longitudinally aligned with the tube portion 38. The car 11 may then be rolled from tube portion 38 onto the cradle 36 after which the cradle 36 may be rotated clockwise until the vehicle on the cradle is aligned with an outgoing tube 39.

Should the vehicle arrive at station 30 with passengers or baggage which is to be unloaded, the cradle 36 with vehicle 11 thereon may be aligned with any of ten additional tubes 40 or suitable car supporting means shown which are provided to effect loading and unloading of the vehicle prior to alignment with the outbound tube 39. Such additional tubes are provided with suitable approaches thereto, and the access door 13 of the vehicle may be opened to permit passengers to board or alight from the vehicle.

It will now be evident that I have provided a novel transportation system for tubular-house vehicles wherein the vehicle while in transit is supported by and stabilized by aerodynamic action which dispenses with the necessity of providing rails or other members for supporting the vehicle while thus in transit.

It is apparent that minor changes may be made in the form and construction of the invention above without departing from the spirit thereof, and the invention includes all such changes as properly come within the scope of the claims.

What is claimed is:

1. A device of the character described comprising a tube through which cars or vehicles are adapted to move; a car or vehicle within said tube having propulsion means, said car exterior conforming adjacent its front end with respect to its direction of propulsion and for a considerable length toward the rear to the inside of the tube and having a smaller diameter than the tube to provide for passage of air between the car and the tube, said car having a portion thereof adjacent the rear end and over a substantial portion such as a semicircular portion of the bottom enlarged transversely of the car to substantially prevent relative passage of air between this portion of the vehicle and the tube wall and thus substantially prevent relative motion of air relative to the vehicle, whereby at high speed of propulsion and relative motion of air and the vehicle over the upper portion of the vehicle, the vehicle or car is supported on air within the tube by the Bernoulli effect caused by the decrease in static pressure of the air at the top of the car and the increase in static pressure on the bottom of the car.

2. The apparatus of claim 1, and wherein the tube is partially evacuated so as to be below atmospheric pressure in the neighborhood of three to four pounds per square inch to reduce the frontal resistance on said vehicle.

3. The apparatus of claim 1, wherein the vehicle is equipped with means to support the vehicle on the interior bottom of the tube at low speeds.

4. A device of the character described comprising: a tube through which cars or vehicles are adapted to sequentially move, a car or vehicle within said tube and having propulsion means, said car exterior adjacent its front end with respect to its direction of propulsion and for a considerable portion of its length being spaced from walls of the tube to define an air passage, said car exterior having a substantial portion adjacent the rear end thereof and at the bottom enlarged transversely of the car to provide a semicircular flange to substantially prevent relative passage of air between the tube wall and car bottom, whereby at high speed of propulsion the primary relative movement of the vehicle and air occurs at the top of the car thus creating a differential pressure between the top and bottom of the car or Bernoulli effect causing the car to be supported on air within the tube.

5. In a transportation system having a substantially horizontal conduit or tube of extended length forming an air chamber and means for controlling the air pressure in said chamber at a partial vacuum: a car or vehicle having propulsion means for movement longitudinally of said conduit, said car being contoured in a different manner at the bottom than the top so that the passage of air relative to the car bottom is more restricted than at the top so that upon application of sufficient propulsion effort a differential in static pressure exists between the car top and bottom whereby said car is made substantially free of contact with said conduit by Bernoulli effect on said moving car.

6. In a transportation system having a substantially horizontal extending tube, a car mounted to traverse within said tube in a longitudinal direction, that improvement which comprises providing a different contouring of the top relative to the bottom of the car exterior so that upon passage of the car through said tube a differential in vertical pressure on said car results, caused by Bernoulli effect, whereby said car is supported vertically by aerodynamic forces.

7. In a transportation system having a tube maintained under substantial vacuum and a car mounted to move longitudinally in said tube, said car having propulsion means, means to substantially prevent friction between said car and tube comprising means on the vehicle contouring said car exterior so that said car is supported within said tube, while propelled, by differential vertical air pressure thereon resulting from aerodynamic action caused by longitudinal relative movement of the car and tube.

8. The apparatus of claim 1, and a closed end short channel means mounted on the exterior of the vehicle near the front and extending rearwardly, to resist upward or downward vehicle tilt thereby to stabilize the moving vehicle in pitch attitude.

9. The apparatus of claim 8, wherein the short channel means comprise two short channel members on opposite sides of the vehicle adjacent the vehicle horizontal centerline plane whereby said two channels, on change in yaw, tend to align the vehicle centerline with the vertical plane of the longitudinal centerline of the tube.

10. The apparatus of claim 1, and means mounted on opposed sides of the vehicle for stabilizing said vehicle longitudinal axis against angular motion in a vertical and in a horizontal plane.

11. The apparatus of claim 6, and members affixed to opposite sides of said car and responsive to aerodynamic forces for maintaining longitudinal alignment of said car and tube.

12. The apparatus of claim 6, and means mounted on the exterior of the vehicle stabilizing the direction of the vehicle longitudinal axis relative to the longitudinal axis of the tube.

References Cited in the file of this patent

UNITED STATES PATENTS

| | | |
|---|---|---|
| 1,000,009 | Jenison | Aug. 8, 1911 |
| 1,053,368 | Eells | Feb. 18, 1913 |
| 1,336,732 | Davy | Apr. 13, 1920 |
| 1,411,597 | Trask | Apr. 4, 1922 |
| 1,813,625 | Knox | July 7, 1931 |
| 2,511,979 | Goddard | June 20, 1950 |
| 3,006,288 | Brown | Oct. 31, 1961 |

OTHER REFERENCES

A Textbook of Physics, by L. B. Spinney, pages 152 to 156, The MacMillan Co., N.Y., 1920.